United States Patent
Balasubramanian et al.

(10) Patent No.: US 9,661,557 B2
(45) Date of Patent: May 23, 2017

(54) CELL SELECTION USING ENHANCED GENERAL NEIGHBOR LIST METHODS

(75) Inventors: Srinivasan Balasubramanian, San Diego, CA (US); Jen Mei Chen, San Diego, CA (US); Manoj M. Deshpande, San Diego, CA (US); Young C. Yoon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1394 days.

(21) Appl. No.: 12/390,155

(22) Filed: Feb. 20, 2009

(65) Prior Publication Data
US 2009/0221287 A1   Sep. 3, 2009

Related U.S. Application Data

(60) Provisional application No. 61/032,380, filed on Feb. 28, 2008.

(51) Int. Cl.
*H04W 4/00*   (2009.01)
*H04W 36/00*   (2009.01)
(Continued)

(52) U.S. Cl.
CPC ........... *H04W 48/16* (2013.01); *H04W 8/005* (2013.01); *H04W 48/20* (2013.01);
(Continued)

(58) Field of Classification Search
CPC ..... H04W 48/16; H04W 16/16; H04W 48/18; H04W 88/06; H04W 72/00;
(Continued)

(56) References Cited

U.S. PATENT DOCUMENTS 8,126,477 B2    2/2012  Dravida et al.
2001/0055969 A1*  12/2001  Bonta et al. .................. 455/436
(Continued)

FOREIGN PATENT DOCUMENTS

JP    2002112302 A    4/2002
JP    2007534213 A    11/2007
(Continued)

OTHER PUBLICATIONS

Dorot, V., et al., "An Explanatory Dictionary of Modern Computer Terms," 2nd Edition, BHV-Petersburg Publishers, Saint Petersburg, 2001, 'Program Product' on p. 339.
(Continued)

*Primary Examiner* — Olumide T Ajibade Akonai
(74) *Attorney, Agent, or Firm* — Changwoo Yang

(57) ABSTRACT

Systems and methodologies are described that facilitate providing neighbor lists to devices comprising pilot frequencies of access points in a specific geographic region. Using the neighbor list, the devices can discover the access points based on scanning the frequencies for the pilot and can determine additional communication parameters from the discovery or based on a subsequent request resulting from discovery. In this regard, access point information need not be provisioned to the devices for locating the access points, selecting/reselecting the access points, providing the access points in a list to an interface, locating the device using triangulation based on GPS position of the access points, and/or the like.

56 Claims, 11 Drawing Sheets

(51) Int. Cl.
    *H04W 48/16*   (2009.01)
    *H04W 84/04*   (2009.01)
    *H04W 8/00*    (2009.01)
    *H04W 48/20*   (2009.01)
    *H04W 88/06*   (2009.01)

(52) U.S. Cl.
    CPC .......... *H04W 84/045* (2013.01); *H04W 36/00* (2013.01); *H04W 88/06* (2013.01)

(58) Field of Classification Search
    CPC ... H04W 72/0453; H04W 8/005; H04W 8/02; H04W 36/00
    USPC .... 455/436, 437, 439, 440, 444, 448, 432.1, 455/432.3, 435.1, 435.2, 435.3, 442, 445, 455/450, 466, 524, 525, 552.1, 553.1; 370/310, 312, 319, 320, 321, 324, 329, 370/330, 331, 332, 335, 338, 350, 352
    See application file for complete search history.

(56) References Cited

U.S. PATENT DOCUMENTS

| | | | |
|---|---|---|---|
| 2004/0165657 A1* | 8/2004 | Simic et al. | 375/211 |
| 2005/0048974 A1* | 3/2005 | Kim et al. | 455/436 |
| 2005/0094574 A1* | 5/2005 | Han et al. | 370/254 |
| 2005/0197156 A1 | 9/2005 | Fourquin et al. | |
| 2006/0215609 A1* | 9/2006 | Kyung et al. | 370/331 |
| 2007/0076662 A1 | 4/2007 | Jain et al. | |
| 2007/0077927 A1* | 4/2007 | Zhao et al. | 455/435.2 |
| 2007/0140163 A1 | 6/2007 | Meier et al. | |
| 2007/0254620 A1 | 11/2007 | Lindqvist et al. | |
| 2008/0146226 A1* | 6/2008 | Claussen et al. | 455/435.1 |
| 2008/0293419 A1* | 11/2008 | Somasundaram et al. | 455/437 |
| 2009/0052382 A1* | 2/2009 | Stephenson et al. | 370/329 |
| 2009/0052395 A1* | 2/2009 | Bao et al. | 370/331 |
| 2009/0163202 A1* | 6/2009 | Humblet et al. | 455/432.1 |
| 2011/0205910 A1* | 8/2011 | Soomro et al. | 370/252 |

FOREIGN PATENT DOCUMENTS

| | | |
|---|---|---|
| WO | WO03049470 A2 | 6/2003 |
| WO | 2005032202 A1 | 4/2005 |
| WO | WO2006083134 A1 | 8/2006 |
| WO | 2007040454 A2 | 4/2007 |

OTHER PUBLICATIONS

International Search Report and Written Opinion—PCT/US2009/035344—ISA/EPO—Jun. 25, 2009.

* cited by examiner

CELL SELECTION USING ENHANCED GENERAL NEIGHBOR LIST METHODS

CLAIM OF PRIORITY UNDER 35 U.S.C. §119

The present Application for patent claims priority to Provisional Application No. 61/032,380 entitled "FEMTO CELL SYSTEM SELECTION USING ENHANCED GLNM" filed Feb. 28, 2008, and assigned to the assignee hereof and hereby expressly incorporated by reference herein.

BACKGROUND

Field

The following description relates generally to wireless communications, and more particularly to enabling cell selection using enhanced general neighbor list methods (GNLM).

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ... ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. As mobile devices move throughout service areas, cells utilized for communication by the devices can be reselected between one or more access points (e.g., macrocells, femtocells, etc.). This can occur, for example, where an available access point, or serving cell thereof, can offer a better signal or service than a current access point. The mobile devices can determine and rank a plurality of surrounding access points for selection/reselection based on measured parameters. In particular, the devices evaluate the surrounding access points when communication with a current access points diminishes below a threshold.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating providing information specific to access points in a geographic region (GEO) allowing receiving devices to locate the access points and/or determine communication parameters related thereto. For example, a general neighbor list method (GNLM) can be extended to include providing pilot frequencies of preferred neighbor access points. In addition, other information can be provided in the list, such as static information including global positioning system (GPS) information, access point type/technology, etc.; the preferred neighbors can be off-frequency access points, in one example. Access terminals can acquire the neighbor list and scan for the preferred neighbors based at least in part on the provided pilot frequencies. The discovery can be proactive, for example, such that the access terminals can evaluate the preferred neighbors using the pilot frequencies and obtain communication parameters regardless of current communication performance. In addition, the discovery can be manually executed by a scan request, in one example.

According to related aspects, a method is provided that includes receiving a neighbor list of frequencies, related to access point pilots in a specific geographic region, from one or more access points in the region. The method also includes scanning one or more frequencies in the neighbor list to acquire additional communication parameters related to an associated access point and populating the neighbor list with the additional communication parameters.

Another aspect relates to a wireless communications apparatus. The wireless communications apparatus can include at least one processor configured to receive a neighbor list of pilot frequencies corresponding to access points in a specific geographic region. The at least one processor is further configured to detect one or more of the access points based at least in part on a respective pilot frequency in the neighbor list and determine one or more additional communication parameters for the one or more access points. The wireless communications apparatus also comprises a memory coupled to the at least one processor.

Yet another aspect relates to an apparatus that includes means for receiving a neighbor list from one or more access points comprising pilot frequencies utilized by disparate access points in a related geographic region and means for determining additional information related to the disparate access points based at least in part on scanning the pilot frequencies.

Still another aspect relates to a computer program product, which can have a computer-readable medium including code for causing at least one computer to receive a neighbor list of frequencies, related to access point pilots in a specific geographic region, from one or more access points in the region. The computer-readable medium can also comprise code for causing the at least one computer to scan one or more frequencies in the neighbor list to acquire additional communication parameters related to an associated access point. Moreover, the computer-readable medium can comprise code for causing the at least one computer to propagate the neighbor list with the additional communication parameters.

Moreover, an additional aspect relates to an apparatus. The apparatus can include a neighbor list component that receives a neighbor list, comprising pilot frequencies of one or more access points specific to a geographic region, from an access point in the geographic region. The apparatus further includes a network scanning component that detects pilots of the one or more access points over the frequencies in the neighbor list and determines one or more additional communication parameters associated with the one or more access points.

According to another aspect, a method is provided that includes receiving a neighbor list of pilot frequencies related to access points in a related geographic region and transmitting the neighbor list to one or more mobile devices.

Another aspect relates to a wireless communications apparatus. The wireless communications apparatus can include at least one processor configured to receive a neighbor list of pilot frequencies related to access points in a geographic region of the wireless communications apparatus and transmitting the neighbor list to one or more mobile devices. The wireless communications apparatus also comprises a memory coupled to the at least one processor.

Yet another aspect relates to an apparatus that includes means for receiving a neighbor list comprising pilot frequencies of one or more access points in a specific geographic region of the apparatus. The apparatus can additionally include means for providing the neighbor list to one or more mobile devices.

Still another aspect relates to a computer program product, which can have a computer-readable medium including code for causing at least one computer to receive a neighbor list of pilot frequencies corresponding to access points in a related geographic region. The computer-readable medium can also comprise code for causing the at least one computer to transmit the neighbor list to one or more mobile devices.

Moreover, an additional aspect relates to an apparatus. The apparatus can include a list management component that receives a neighbor list of pilot frequencies related to one or more access points in a geographic region of the apparatus. The apparatus further includes a list transmitting component that sends the neighbor list to one or more mobile devices.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
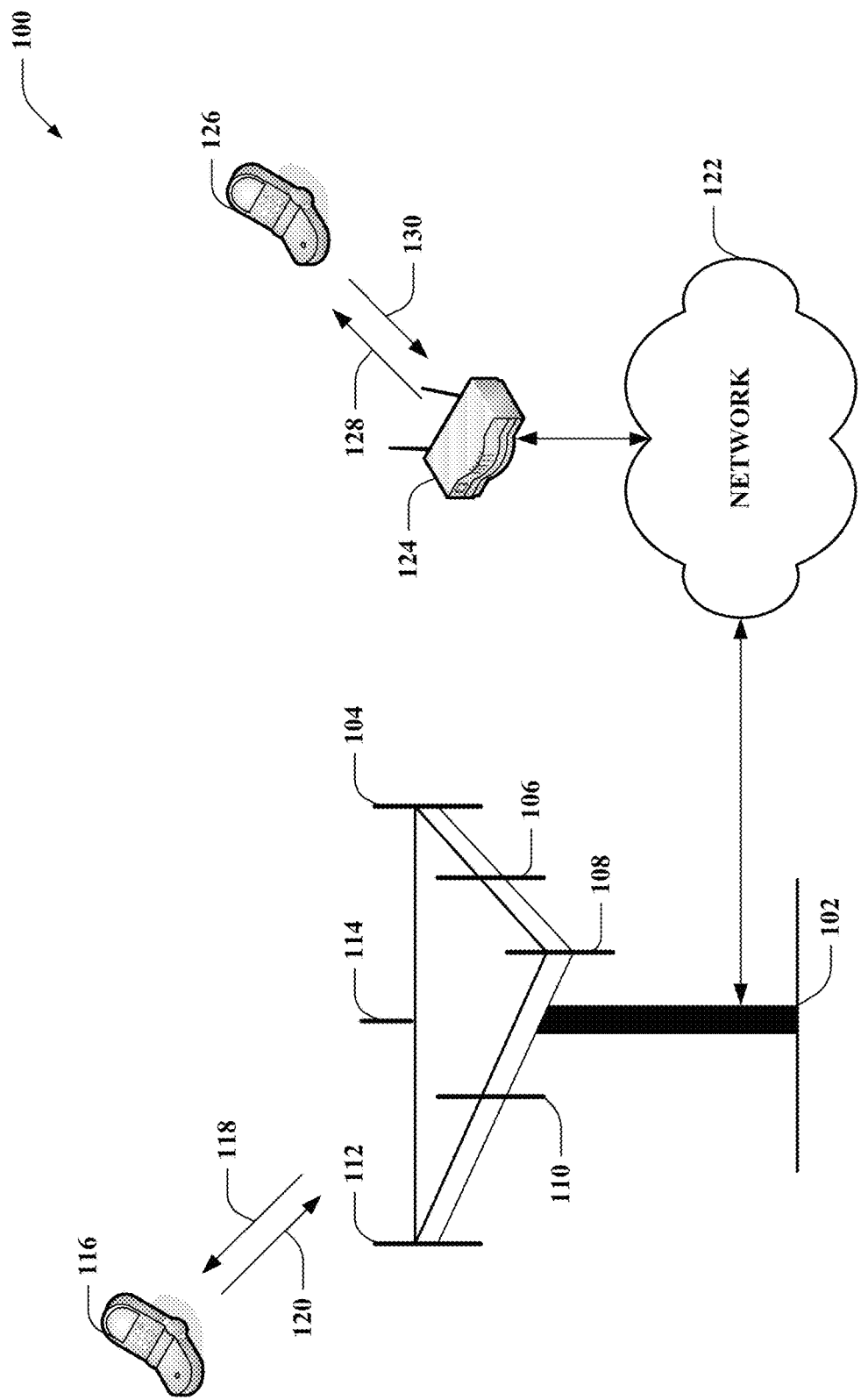
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 126; however, it is to be appreciated that base station 102 can communicate with substantially any number of mobile devices similar to mobile devices 116 and 126. Mobile devices 116 and 126 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. In a frequency division duplex (FDD) system, forward link 118 can utilize a different frequency band than that used by reverse link 120, for example. Further, in a time division duplex (TDD) system, forward link 118 and reverse link 120 can utilize a common frequency.

Each group of antennas and/or the area in which they are designated to communicate can be referred to as a sector or cell of base station 102. For example, antenna groups can be designed to communicate to mobile devices in a sector of the areas covered by base station 102. In communication over forward link 118, the transmitting antennas of base station 102 can utilize beamforming to improve signal-to-noise ratio of forward link 118 for mobile device 116. Also, while base station 102 utilizes beamforming to transmit to mobile device 116 scattered randomly through an associated coverage, mobile devices in neighboring cells can be subject to less interference as compared to a base station transmitting through a single antenna to all its mobile devices. Moreover, mobile devices 116 and 126 can communicate directly with one another using a peer-to-peer or ad hoc technology.

In addition, the base station 102 can communicate with a network 122, which can be one or more networks including a wireless service access network (e.g., a 3G network), over a backhaul link connection. The network 122 can store information regarding access parameters related to the mobile device 116 and 126 and other parameters of a wireless access network to provide service to the devices 116 and 126. Furthermore, a femtocell access point 124 can be provided to facilitate communicating with the mobile device 126 over forward link 128 and reverse link 130 (similarly to forward link 118 and reverse link 120, as described supra). The femtocell access point 124 can provide access to one or more mobile devices 126 much like the base station 102, but on a smaller scale. In one example, femtocell access point 124 can be configured in a residence, business, and/or other close range setting (e.g., theme park, stadium, apartment complex, etc.). The femtocell access point 124 can connect to the network 122 utilizing a backhaul link connection, which can be over a broadband Internet connection (T1/T3, digital subscriber line (DSL), cable, etc.), in one example. The network 122 can similarly provide access information for the mobile device 126.

According to an example, mobile devices 116 and 126 can travel over service areas initiating wireless access or performing cell reselection among disparate base stations and/ or femtocells during travel or while stationary. In this regard, the mobile devices 116 and 126 can effectuate continuous wireless service seamless to users of the mobile devices 116 and 126. In one example (not shown), mobile device 126 can have been communicating with the base station 102 similarly to the mobile device 116, and can have moved into a specified range of the femtocell access point 124. In this regard, the mobile device 126 can have reselected one or more cells related to the femtocell access point 124 to receive more desirable wireless service access. In addition, where mobile device 126 moves toward base station 102, it can reselect a cell related thereto, at some point, for a variety of reasons (e.g., to mitigate interference on the femtocell access point 124, to receive a more optimal signal or increased throughput, etc.).

In traveling over the service area, a given mobile device 116 and/or 126 can continually measure available base stations (such as base station 102), femtocells (such as femtocell access point 124), and/or other access points, to determine when cell reselection is beneficial to the mobile device 116 and/or 126. The measuring can include, for example, evaluating signal quality, throughput, services available, a wireless access provider related to the access point, and/or the like. Based on one or more of the measurements, the mobile device 116 and/or 126 can rank access points for reselection. Upon determining the ranking, the mobile device 116 and/or 126 can attempt cell reselection with the highest ranking access point.

According to an example, the base station 102 and/or femtocell access point 124 can provide a neighbor list to the mobile devices 116 and/or 126 that specifies pilot frequencies and/or other identifiers relating to surrounding access points, which can be preferred neighbors, using a general neighbor list method (GNLM). The neighbor list can be specific to one or more cells of the base station 102 and/or femtocell access point 124 and can indicate preferred access point neighbors related to a geographic region (e.g., GEO) of the base station 102 and/or femtocell access point 124. In addition, the neighbor list can indicate frequency information related to one or more access points, which can be off-frequency (e.g., a femtocell access point utilizing a frequency outside of normal macrocell access points). The mobile devices 116 and/or 126 can acquire the neighbor list and proactively discover access points while acquiring communication parameters related thereto based on information in the list. For example, where the list provides pilot frequencies of the preferred access point neighbors, the mobile devices 116 and/or 126 can scan the frequencies to discover the neighbors and/or acquire information therefrom.

Since the base station 102 and/or femtocell access point 124 can transmit the neighbor list, they (or the network 122, for instance) can additionally update the list to reflect modifications in one or more access points such that the neighbor list sent to the mobile devices 116 and 126 typically possesses the current correct parameters for the access points. By maintaining a current list of access points in the region, the mobile devices 116 and/or 126 can determine a access point off-frequency for requesting wireless network access when moving out of macrocell coverage, in one example. In addition, the neighbor list can be utilized for mobile device 116 and/or 126 location. In this regard, the mobile device 116 and/or 126 can determine one or more access points, determine a distance to the one or more access points, and acquire global positioning system (GPS) information related to the access points. Such information can be collaborated with similar acquired information of other access points, macrocells, and/or the like, to determine location of the mobile device 116 and/or 126 using triangulation. In one example, the neighbor list can specify the GPS information related to a particular access point.

In addition, access point types can be explicitly indicated in the neighbor list to distinguish, for example, femtocell access points from macrocell access points or other access points. Thus, the mobile devices 116 and/or 126 can determine neighboring femtocells from the neighbor list. In this regard, the femtocells can be avoided during reselection where macrocell coverage is more desirable (e.g., for a mobile device moving rapidly through the wireless network). In another example, the mobile devices 116 and/or 126 can scan for neighboring femtocells to determine one or more femtocells from which to request wireless network access; thus, the neighbor list can be utilized to display only cells indicated as femtocells. In addition, the mobile devices 116 and/or 126 can utilize the neighbor list in conjunction with a preferred roaming list (PRL) to determine access points in the region for roaming. Thus, a mechanism is provided for region-specific femtocell identification, for subsequent selection/reselection, without requiring provisioning of femtocell information, which can be advantageous as this information can be modified over time, in one example.

Figure 2:
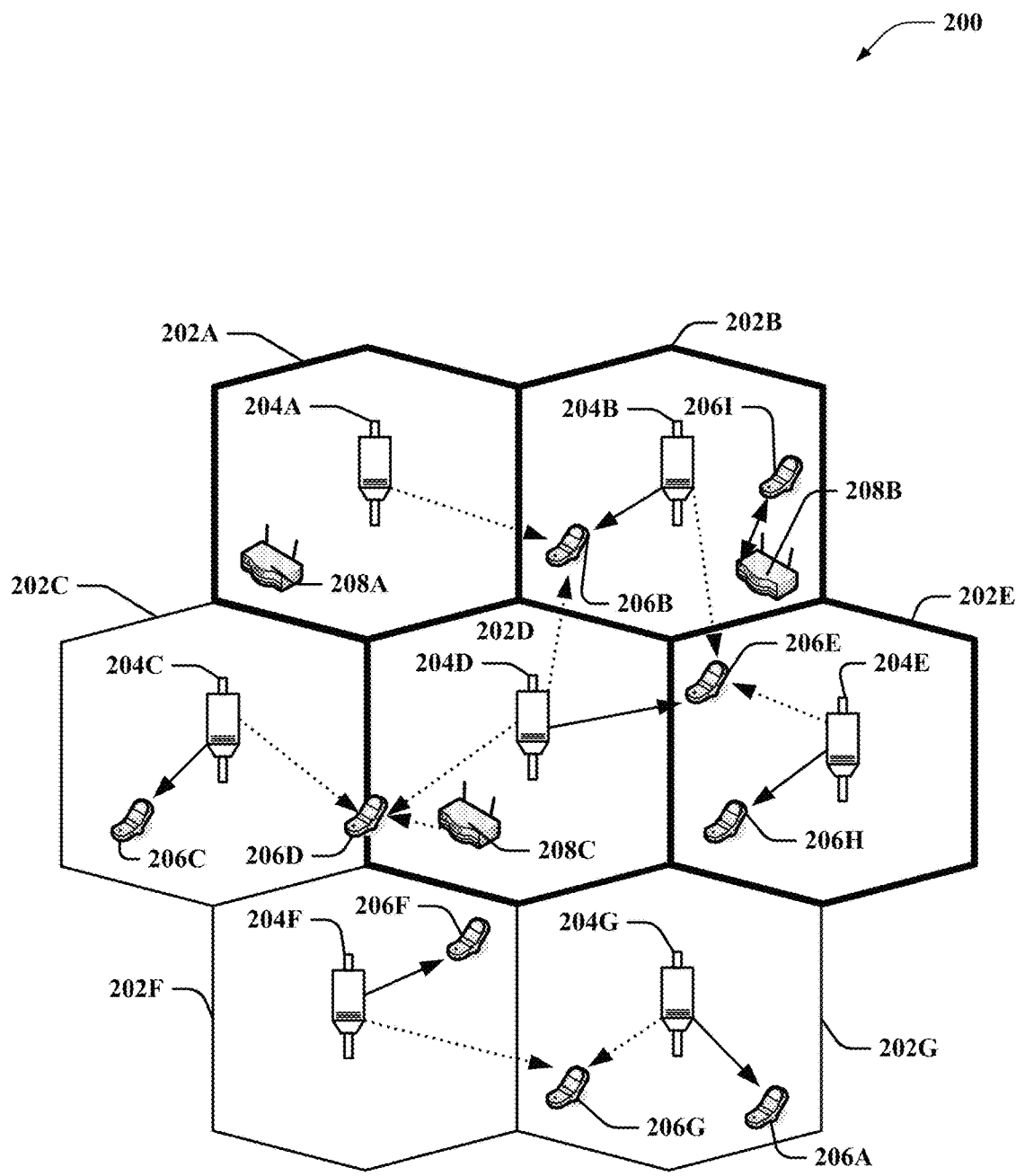
FIG. 2 is an illustration of a wireless communication network in accordance with aspects described herein.

Now referring to FIG. 2, a wireless communication system 200 configured to support a number of mobile devices is illustrated. The system 200 provides communication for multiple cells, such as for example, macrocells 202A-202G, with each cell being serviced by a corresponding access point 204A-204G. As described previously, for instance, the access points 204A-204G related to the macrocells 202A-202G can be base stations. Mobile devices 206A-206I are shown dispersed at various locations throughout the wireless communication system 200. Each mobile device 206A-206I can communicate with one or more access points 204A-204G on a forward link and/or a reverse link, as described. In addition, access points 208A-208C are shown. These can be smaller scale access points, such as femtocells, offering services related to a particular service location, as described. The mobile devices 206A-206I can additionally or alternatively communicate with these smaller scale access points 208A-208C to receive offered services. The wireless communication system 200 can provide service over a large geographic region, in one example (e.g., macrocells 202A-202G can cover a few blocks in a neighborhood, and the femtocell access points 208A-208C can be present in areas such as residences, office buildings, and/or the like as described). In an example, the mobile devices 206A-206I can establish connection with the access points 204A-204G and/or 208A-208C over the air and/or over a backhaul connection.

Additionally, as shown, the mobile devices 206A-206I can travel throughout the system 200 and can reselect cells related to the various access points 204A-204G and/or 208A-208C as it moves through the different macrocells 202A-202G or femtocell coverage areas. In one example, the one or more of the mobile devices 206A-206I can be associated with a home femtocell related to at least one of femtocell access points 208A-208C. For example, mobile device 206I can be associated with femtocell access point 208B as its home femtocell. Thus, though mobile device 206I is in macrocell 202B, and thus in coverage area of access point 204B, it can communicate with the femtocell access point 208B instead of (or in addition to) access point 204B. In one example, the femtocell access point 208B can provide additional services to the mobile device 206I, such as desirable billing or charges, minute usage, enhanced services (e.g., faster broadband access, media services, etc.).

According to an example, the access points 204A-204G and/or femtocell access points 208A-208C can provide one or more mobile devices 206A-206I with a neighbor list using a GNLM. The neighbor list can comprise a list of pilot frequencies corresponding to surrounding access points in a related geographic area. As shown, for example, cells 202A, 202B, 202D, and 202E can be in a common geographic region. In this regard, for instance, access point 204B can provide a neighbor list to mobile device 206B that includes frequencies (e.g., pilot frequencies) related to access points 204A, 204D, and 204E, and/or femtocell access points 208A-208C. Using this information, the mobile device 206B can scan the provided frequencies to determine one or more parameters related to access points 204A, 204D, 204E, and/or 208A-208C. Thus, the mobile device 206B can store a list of neighboring access points (e.g., preferred neighbors, which can be dictated by the underlying wireless network, in one example, based on the mobile device, geographic location, and/or the like), along with acquired communication parameters for subsequent selection/reselection, as described. This allows the mobile device 206B to retain a current list of access points initially identified by pilot frequency and determine remaining parameters, as such parameters can change over time.

In addition, the neighbor list provided to the mobile devices can specify a type of the indicated access point (e.g., femtocell, macrocell, pico, relay, mobile base station, peer-to-peer, ad-hoc, etc.). In one example, where the mobile device 206I moves out of range of the macro network (not shown), it accordingly can have a list of neighboring femtocell access points to which it can attempt communication establishment. In another example, the mobile device 206I can communicate with access points on the neighbor list to determine a type. By indicating a type in the neighbor list, type based functionality can be provided. For example, the mobile device 206I can scan for a list of femtocells for selection/reselection thereof and/or present the list using an interface. Similarly, the neighbor list can indicate a technology related to the access point (e.g., LTE, UMTS, WiMAX, etc.), in one example. As described, since the neighbor list is provided by the access points, the underlying wireless network can effectuate changes to the list to support modified parameters at the related access points. Thus, the mobile devices can receive a current list from an access point in the region.

Moreover, the neighbor list can indicate additional information regarding the access points, such as GPS location information. In this regard, mobile device 206B, for example, can receive frequencies of the access points 204A, 204B, 204D, and 204E along with GPS information in the neighbor list. The mobile device 206B can determine distance to each access point based at least in part on receiving a signal, and can compute its location using triangulation based on the GPS coordinates and distance. Thus, the mobile device 206B, in this example, need not communicate with the access points 204A, 204B, 204D, or 204E to determine location information. It is to be appreciated that a geographic region can be identified by parameters other than cell boundaries, such as geographic lines or markings, and/or the like. In one example, the access points can advertise their association with a specific geographic region.

Figure 3:
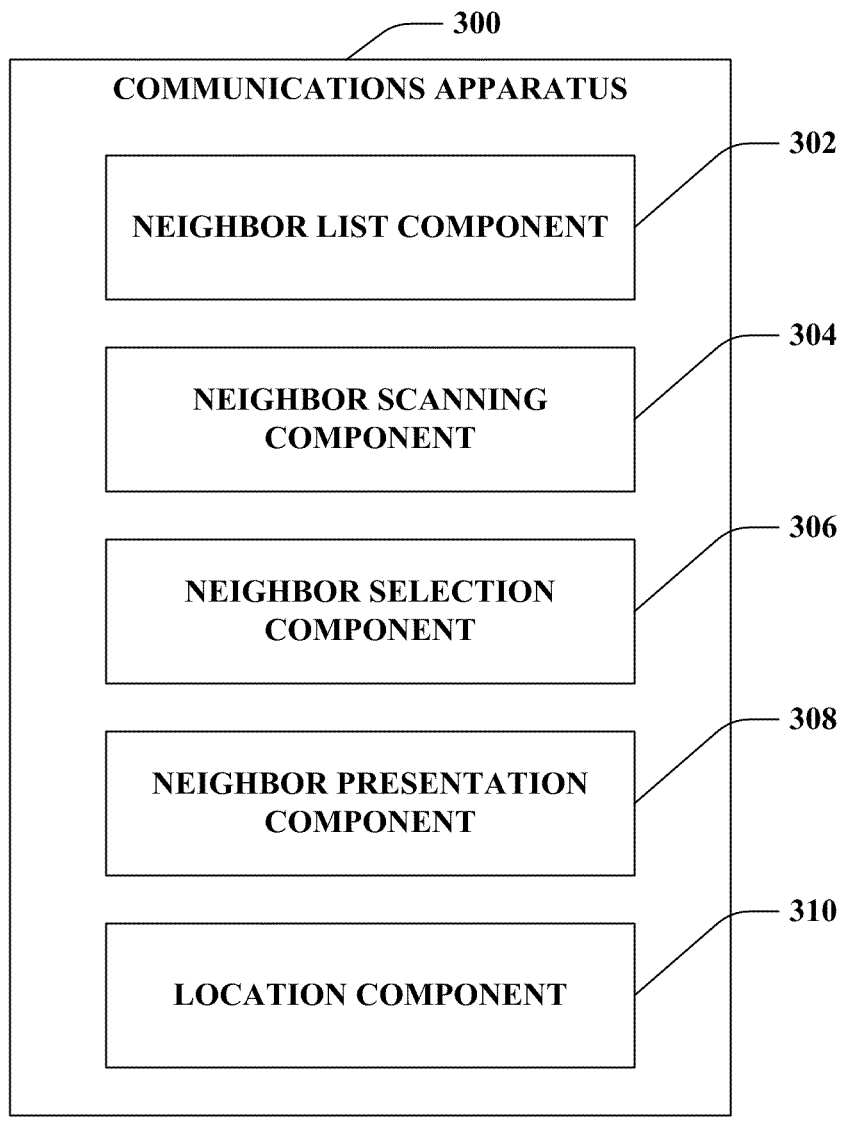
FIG. 3 is an illustration of an example communications apparatus for employment within a wireless communications environment.

Turning to FIG. 3, illustrated is a communications apparatus 300 for employment within a wireless communications environment. The communications apparatus 300 can be a mobile device or a portion thereof, or substantially any communications apparatus that communicates over and/or receives access to a wireless network. The communications apparatus 300 can include a neighbor list component 302 that receives a neighbor list of pilot frequencies related to one or more access points specific to a geographic region, a neighbor scanning component 304 that detects one or more access points in the geographic region based on the list, a neighbor selection component 306 that establishes communication with the one or more access points during cell selection/reselection, a neighbor presentation component 308 that lists neighboring access points, and a location component 310 that determines a location of the communication apparatus 300 based at least in part on the neighbor list.

According to an example, the neighbor list component 302 can receive a neighbor list from an access point (not shown) comprising a number of pilot frequencies corresponding to preferred access point neighbors in a specific geographic region related to the access point. The neighbor scanning component 304 can evaluate the access points by scanning for the pilot on the indicated frequency. Once the pilot is received, the neighbor scanning component 304 can communicate with the access points to acquire additional information regarding the access points, such as parameters for establishing communication therewith. This can occur, for example, proactively where the neighbor scanning component 304 determines the additional access point information at various random or scheduled times (as opposed to when the information is needed as current communication with a disparate access point begin to degrade), and/or the like. The neighbor scanning component 304 can retain the information for subsequent utilization in a variety of contexts.

In one example, the communication apparatus 300 can travel outside of macrocell coverage, and the neighbor selection component 306 can consult the neighbor scanning component 304 to determine communication parameters for one or more neighboring access points in the geographic region. In an example, the neighbor list received by the neighbor list component 302 can distinguish between frequencies for macrocell access points and those relating to femtocell access points, and the neighbor selection component 306 can request only femtocell access points from the neighbor selection component 306 since macrocell coverage is no longer available. In an alternate example, the neighbor selection component 306 can request only macrocell access points where the communications apparatus 300 is moving rapidly through a wireless network coverage area. Moreover, in one example, the neighbor scanning component 304 can populate a PRL and/or related acquisition table with the frequencies indicated in the neighbor list to facilitate scanning the frequencies and selection/reselection to a related access point using conventional PRL functionality.

According to another example, the neighbor presentation component 308 can provide a list of neighboring access points. This can occur, for example, in response to a command from an interface (such as a user interface, application program interface, and/or the like). The provided list, for example, can be filtered by access point type, technology, and/or the like, as described. Thus, for example, the neighbor presentation component 308 can display a list of neighboring femtocell access points by filtering the neighbor list, which can include pilot frequencies for multiple types of access points, and displaying related information acquired by the neighbor scanning component 304, as described above, such as an identifier, and/or other communication parameters. The neighbor presentation component 308 can allow selection of a provided femtocell access point for communication establishment, in one example.

Additionally, the neighbor list received by the neighbor list component 302 can comprise GPS location information related to the access points for which pilot frequencies are provided. In this regard, the location component 310 can detect a distance to one or more access points in the neighbor list based on evaluating a signal related thereto. The location component 310 can subsequently determine a location of the communications apparatus 300 using triangulation based at least in part on the detected distances and corresponding received GPS locations of the access points. Thus, the communications apparatus 300 need not communicate with each access point to receive the GPS location information.

Figure 4:
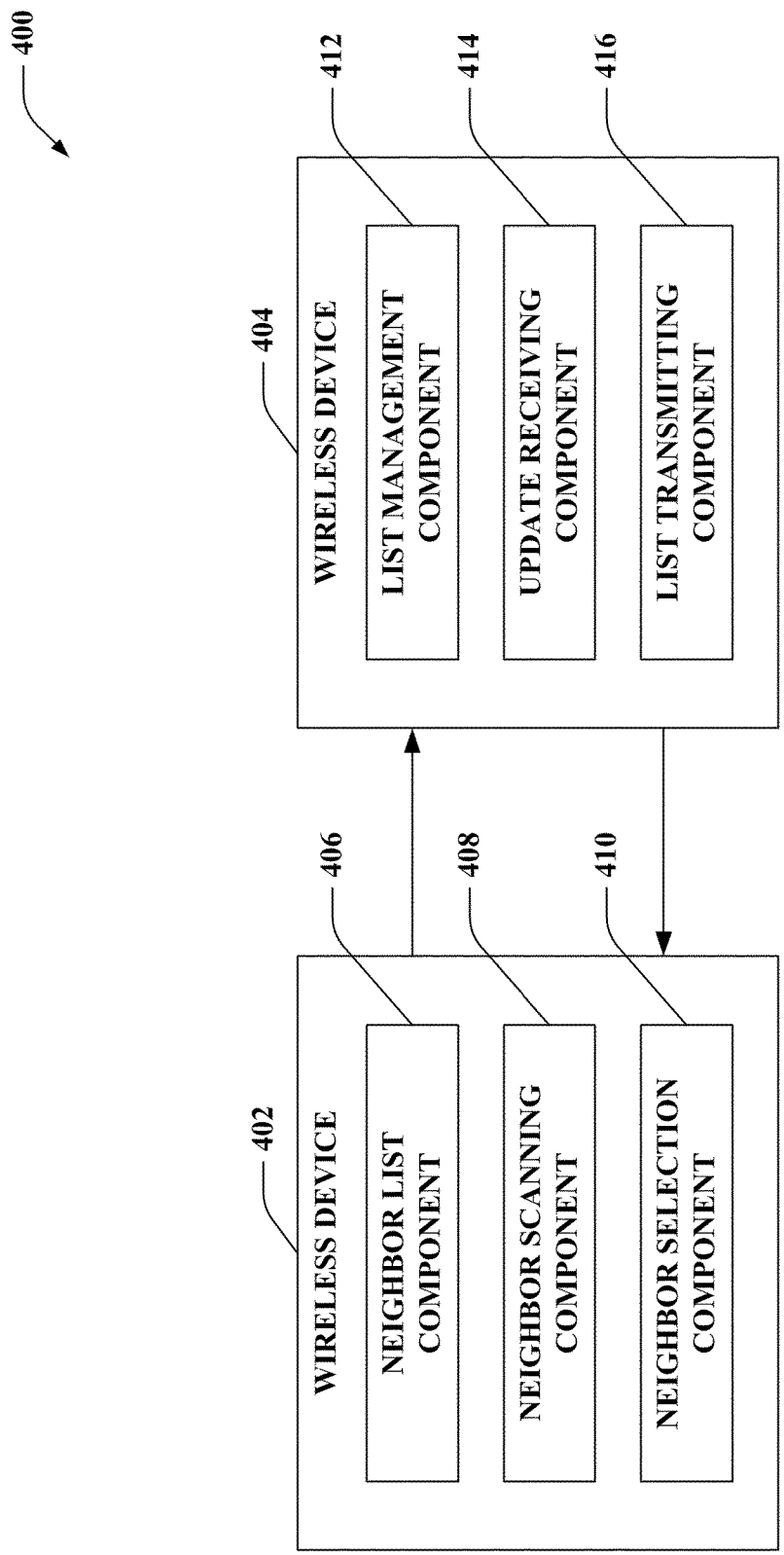
FIG. 4 is an illustration of an example wireless communications system that effectuates providing geographic specific neighbor lists.

Now referring to FIG. 4, illustrated is a wireless communications system 400 that facilitates providing region-specific neighboring access point pilot frequency lists. Wireless devices 402 and 404 can be a mobile device (including not only independently powered devices, but also modems, for example), a base station, and/or portion thereof, or substantially any wireless device. Moreover, system 400 can be a MIMO system and/or can conform to one or more wireless network system specifications (e.g., EV-DO, 3GPP, 3GPP2, 3GPP LTE, WiMAX, etc.) and can comprise additional components to facilitate communication between wireless devices 402 and 404. In addition, components shown in the wireless device 402 can be present in wireless device 404 and vice versa.

The wireless device 402 can comprise a neighbor list component 406 that receives a neighbor list from one or more access points, a neighbor scanning component 408 that can acquire communication parameters related to access points in a neighbor list, and a neighbor selection component 410 that options one or more access points in a neighbor list for communication establishment using determined communication parameters. The wireless device 404 can comprise a list management component 412 that creates and maintains a list of pilot frequencies related to access points in a geographic region of the wireless device 404, an update receiving component 414 that detects or receives (e.g., from an associated network) modification in access point information and populates the change to the list, and a list transmitting component 416 that provides the neighbor list to one or more wireless devices.

According to an example, the list management component 412 can received and/or create a list of access points available in a geographic region of the wireless device 404. The list can be created from information received from an operator of a wireless network, for example, such that the wireless network manages access point configuration in the network. In another example, the list management component 412 can create the list based at least in part on observed parameters of various access points with which the wireless device 404 can communicate. The update receiving component 414, in one example, can process updates to the list, which can be received from the wireless network, received from the various access points, or detected based on behavior of the access points. Updates, for instance, can relate to addition of an access point to a wireless network (e.g., a femtocell registering on the network), change in pilot frequency, location, or other parameters maintained in the list. In this regard, as described, the list management component 412 can maintain GPS location information in the list as well.

The list transmitting component 416 can populate the list to one or more wireless devices, such as wireless device 402, over a broadcast channel, in one example. As described, the neighbor list component 406 can identify the frequencies in the list, and the neighbor scanning component 408 can begin to discover access points transmitting pilots over the frequencies, acquiring additional communication parameters for the discovered access points. It is to be appreciated that scanning the known frequencies for the region-specific access points can conserve power and resources on the wireless device 402. Thus, if the wireless device 402 moves out of communication range of wireless device 404, the neighbor selection component 410 can select an access point from the neighbor list for establishing communication. Similarly, if the wireless device 402, for example, is powered off, moved to another location out of macrocell coverage but in the same geographic region, and powered back on, the neighbor list component 406 can maintain its list of neighboring access points and related information for establishing communication even where the access points available are off-frequency.

In addition, as described, the list management component 412 can distinguish access point types in the list (e.g. femtocell, macrocell, pico, relay, etc.), and the neighbor selection component 410 can evaluate the type when selecting an access point for communication establishment. In this regard, as well, the neighbor scanning component 408 can only scan for one type of access point, if desired. In one example, where the wireless device 402 is provisioned or is otherwise familiar with macrocells, the neighbor scanning component 408 can acquire further information on only the femtocell access points to save resources. The list management component 412 can similarly distinguish technologies of the access points, as described. Moreover, the operator of the network can assign pilot frequencies to the access points based on type and/or technology. Thus, for example, femtocell access points can be assigned a block of frequencies over which they can transmit pilot signals. The neighbor scanning component 408, neighbor selection component 410, or other component of the wireless device 402 can distinguish the access points based on the frequency specified in the list.

Figure 5:
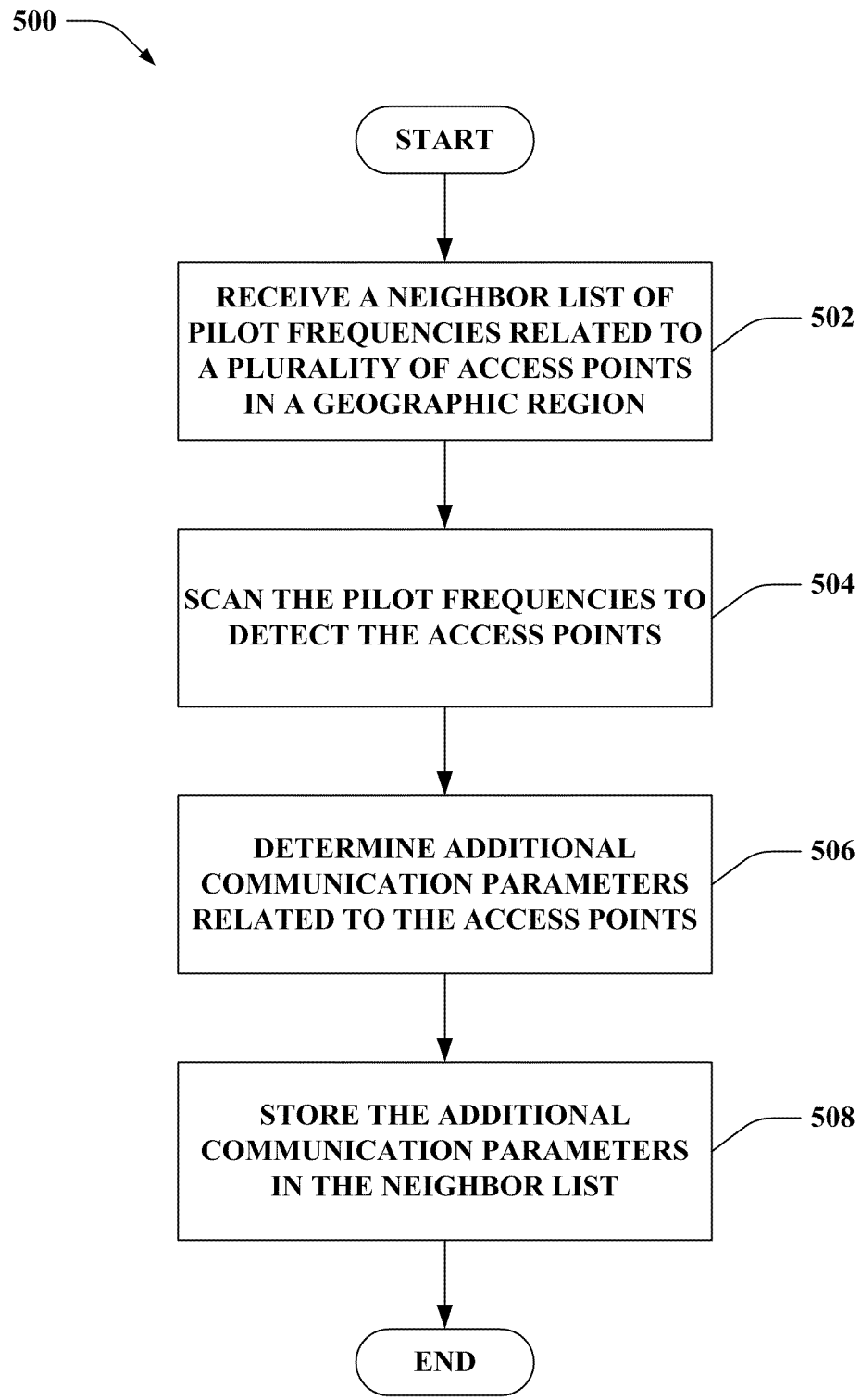
FIG. 5 is an illustration of an example methodology that facilitates receiving a neighbor list of pilot frequencies related to access points in a geographic region.
Figure 6:
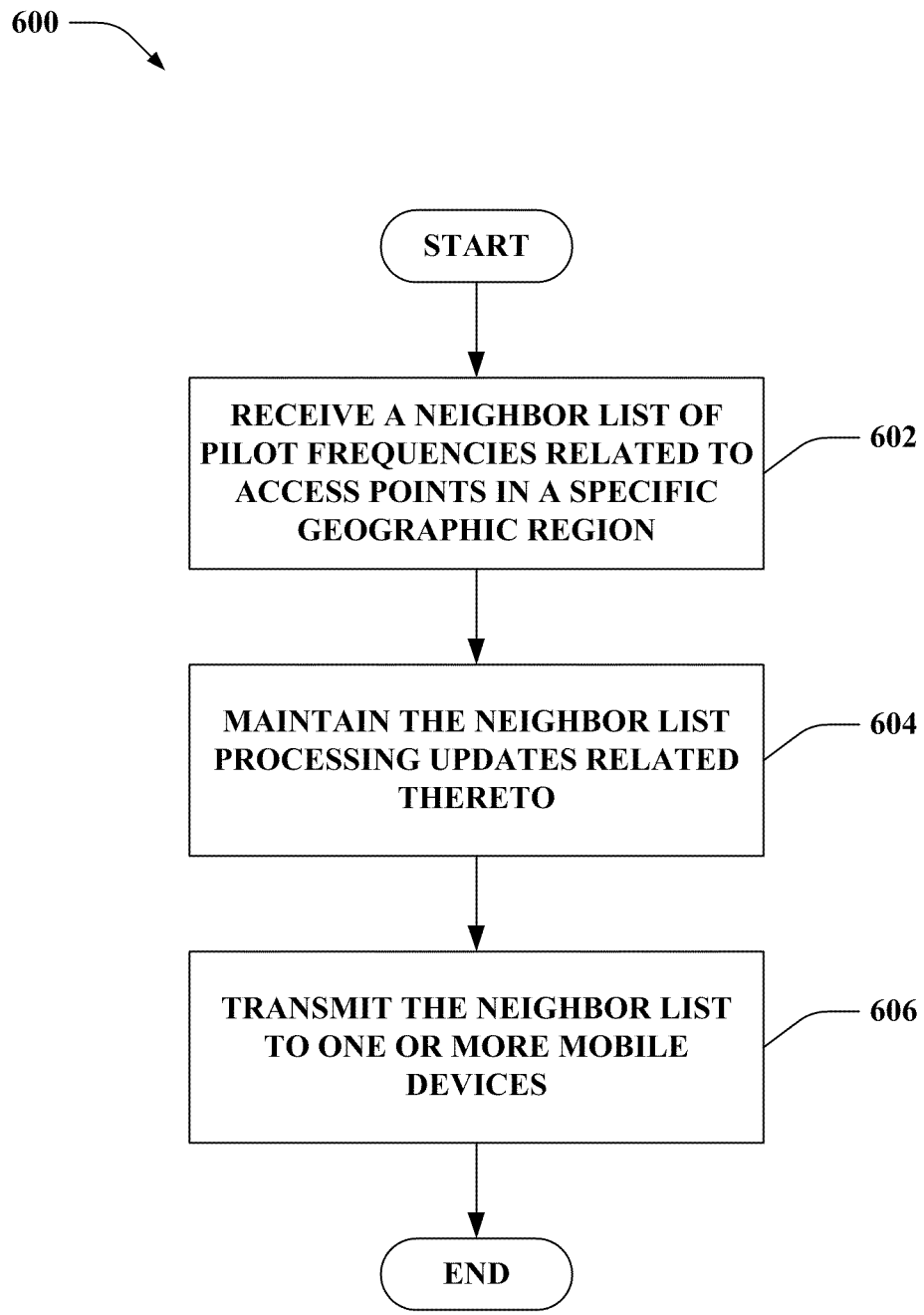
FIG. 6 is an illustration of an example methodology that facilitates providing a neighbor list of access point pilot frequencies for a specified geographic region.

Referring to FIGS. 5-6, methodologies relating to providing neighbor lists with pilot frequencies of access points in a specific geographic region are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Turning to FIG. 5, an example methodology 500 that facilitates utilizing a list of pilot frequencies to discover neighboring access points is illustrated. At 502, a neighbor list of pilot frequencies is received relating to a plurality of access points in a geographic region. As described, the neighbor list can present frequencies related to surrounding access points in a geographic region (and/or a range of such frequencies) to allow frequency-specific scanning for determining additional information related to the access points. Thus, at 504, the pilot frequencies can be scanned to detect the access points. This can conserve power since not all frequencies need to be scanned; in addition, providing a list of pilot frequencies allows other information on the access points to be modified (e.g., operating frequencies, PN offsets, or other communication parameters) without requiring list provisioning.

At 506, additional communication parameters can be determined as related to the access points. The parameters can be acquired, for example, once the pilot is located, and can come from the pilot and/or in response to requests transmitted to the access points following identification. In addition, some additional parameters can be present in the neighbor list, as described (such as GPS information, access point type or technology, and/or the like). At 508, the additional communication parameters can be stored in the neighbor list for subsequent use (e.g., establishing communication with the access point, distinguishing types of access point for establishing communication, presenting a list of access points for an interface, determining a current location, etc.).

Referring to FIG. 6, an example methodology 600 is shown that facilitates providing a neighbor list of pilot frequencies to one or more mobile devices. At 602, a neighbor list of pilot frequencies related to access points in a specific geographic region is received. The list can be received from one or more underlying wireless network components and/or based on detecting access points specific to the region. At 604, the neighbor list can be maintained at least in part by processing updates related to the neighbor list, as described. The updates can relate to adding access points to the list, modifying one or more parameters related to the access points, and/or the like. At 606, the neighbor list can be transmitted to one or more mobile devices. Thus, the mobile devices can use the neighbor list to discover access points in the geographic region, as described.

It will be appreciated that, in accordance with one or more aspects described herein, inferences can be made regarding locating one or more access points based on received frequencies and/or ranges, determining one or more additional parameters regarding the access points, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
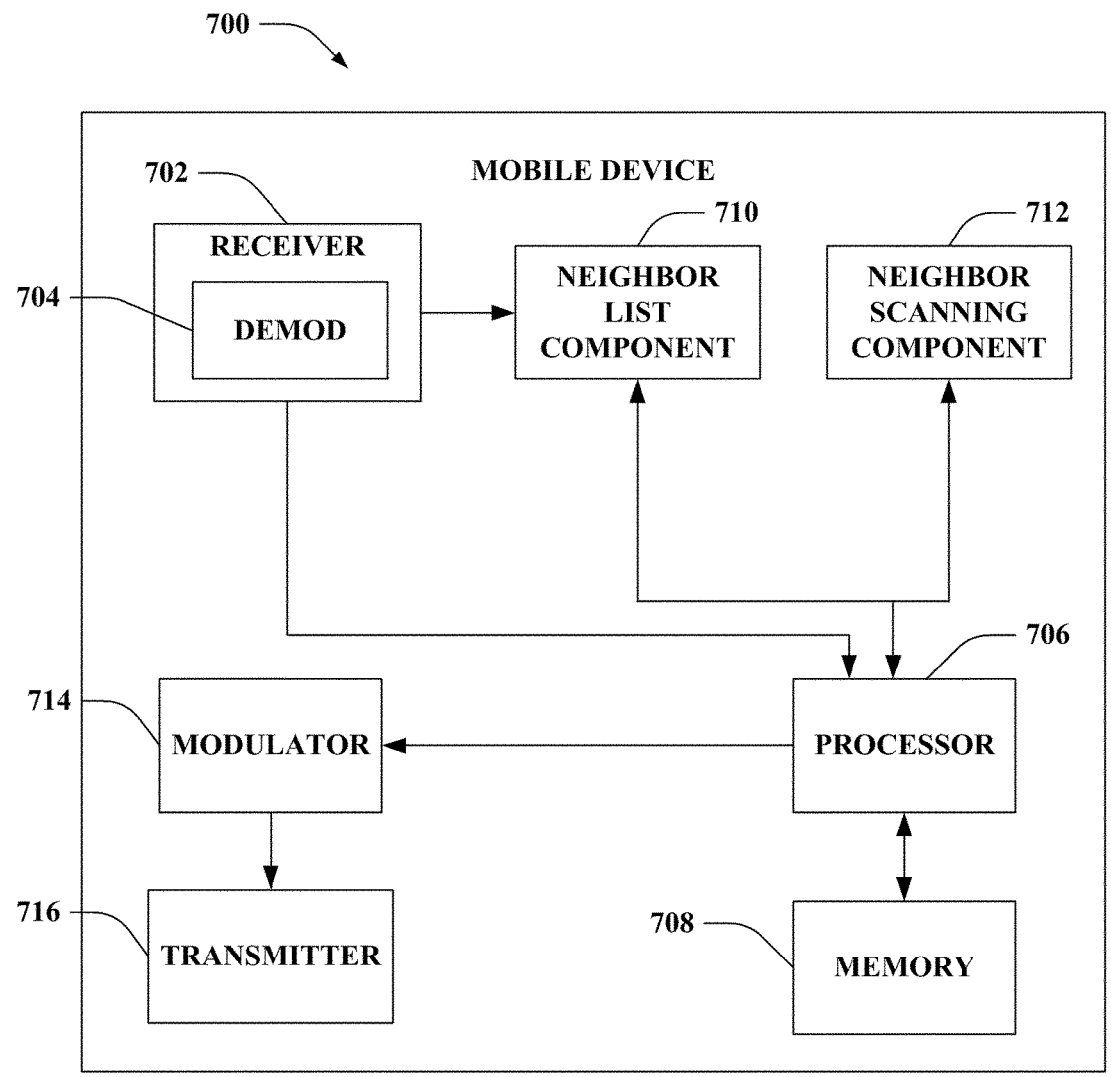
FIG. 7 is an illustration of an example mobile device that facilitates discovering access points based on a geographic region-specific neighbor list.

FIG. 7 is an illustration of a mobile device 700 that facilitates maintaining a list of neighboring access points. Mobile device 700 comprises a receiver 702 that receives one or more signals over one or more carriers from, for instance, a receive antenna (not shown), performs typical actions on (e.g., filters, amplifies, downconverts, etc.) the received signals, and digitizes the conditioned signals to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Receiver 702 and/or processor 706 can further be operatively coupled to a neighbor list component 710 that can receive a list of pilot frequencies related to neighboring access points in a specific geographic region. A neighbor scanning component 712 is also operatively coupled to the processor 706 to facilitate scanning the pilot frequencies to discover and/or acquire additional communication parameters related to the neighboring access points, as described. Using this information, the mobile device 700 can present filtered lists of the access points, select one or more access points for communication establishment, locate the mobile device 700 using triangulation, and/or the like, as described. Mobile device 700 still further comprises a modulator 714 and transmitter 716 that respectively modulate and transmit signals to, for instance, a base station, another mobile device, etc. Although depicted as being separate from the processor 706, it is to be appreciated that the neighbor list component 710, neighbor scanning component 712, demodulator 704, and/or modulator 714 can be part of the processor 706 or multiple processors (not shown).

Figure 8:
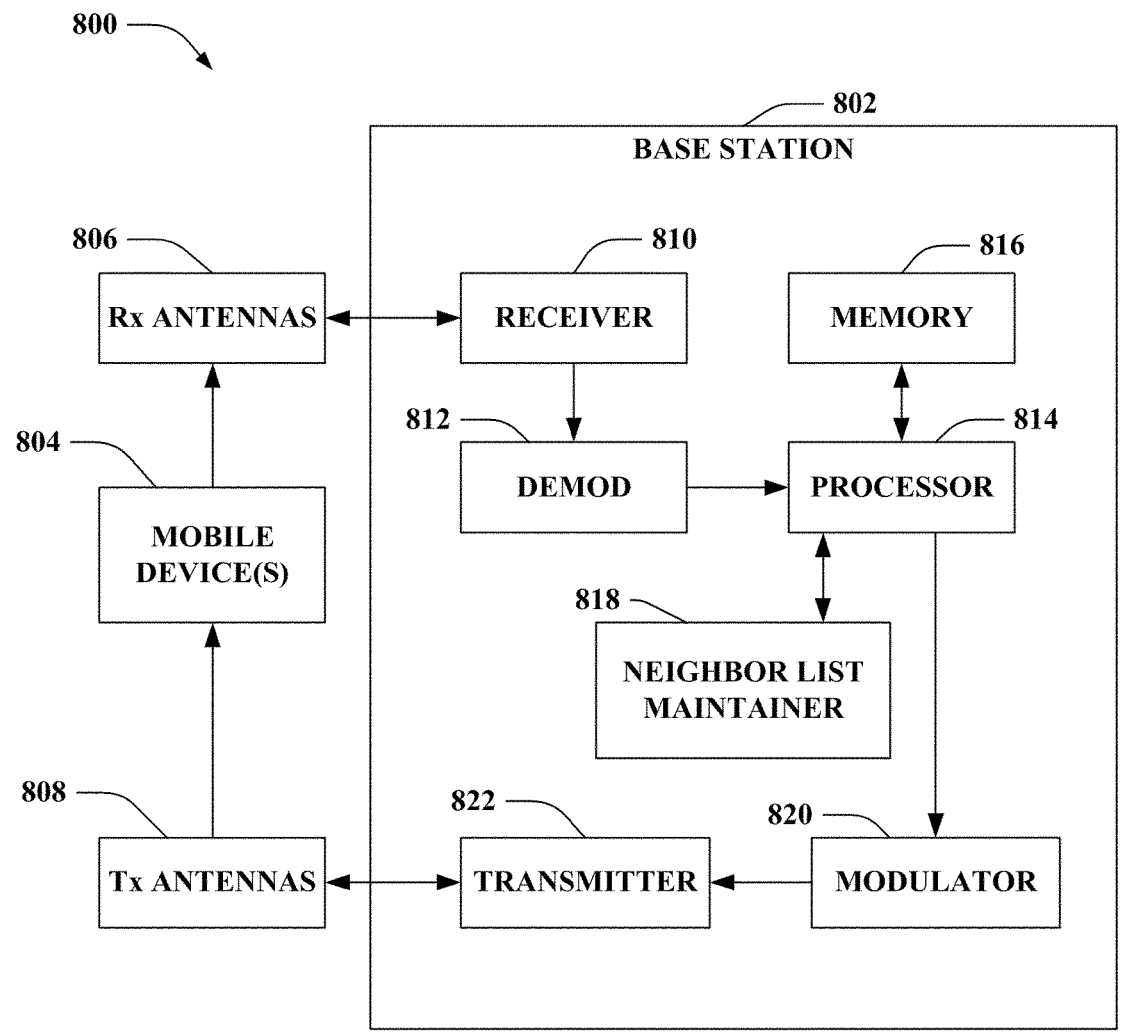
FIG. 8 is an illustration of an example system that maintains and provides a region-specific neighbor list of pilot frequencies.

FIG. 8 is an illustration of a system 800 that facilitates providing neighbor lists comprising frequencies of access points in a specific geographic region to one or more mobile devices. The system 800 comprises a base station 802 (e.g., access point, . . . ) with a receiver 810 that receives signal(s) from one or more mobile devices 804 through a plurality of receive antennas 806, and a transmitter 822 that transmits to the one or more mobile devices 804 through a transmit antenna 808. Receiver 810 can receive information from receive antennas 806 and is operatively associated with a descrambler that can decode received signals. Furthermore, demodulator 812 can demodulate received descrambled signals. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a neighbor list maintainer 818 that can manage and provide a neighbor list to one or more mobile devices 804.

According to an example, the neighbor list maintainer 818 can receive a neighbor list of pilot frequencies related to one or more access points in a geographic region. For example, the neighbor list can be received from an underlying wireless network component (not shown). In addition, the neighbor list maintainer 818 can process updates to the neighbor list based on updates received from the wireless network, detected changes to one or more access points, and/or the like, as described. The neighbor list maintainer 818 can provide the list to one or more mobile devices 804 to facilitate to allow subsequent access point discovery by the mobile devices 804 based on the provided pilot frequencies. In addition, the neighbor list maintainer 818 can include other access point information in the neighbor list, such as GPS location, access point type, access point technology, etc. Furthermore, although depicted as being separate from the processor 814, it is to be appreciated that the demodulator 812, neighbor list maintainer 818, and/or modulator 820 can be part of the processor 814 or multiple processors (not shown).

Figure 9:
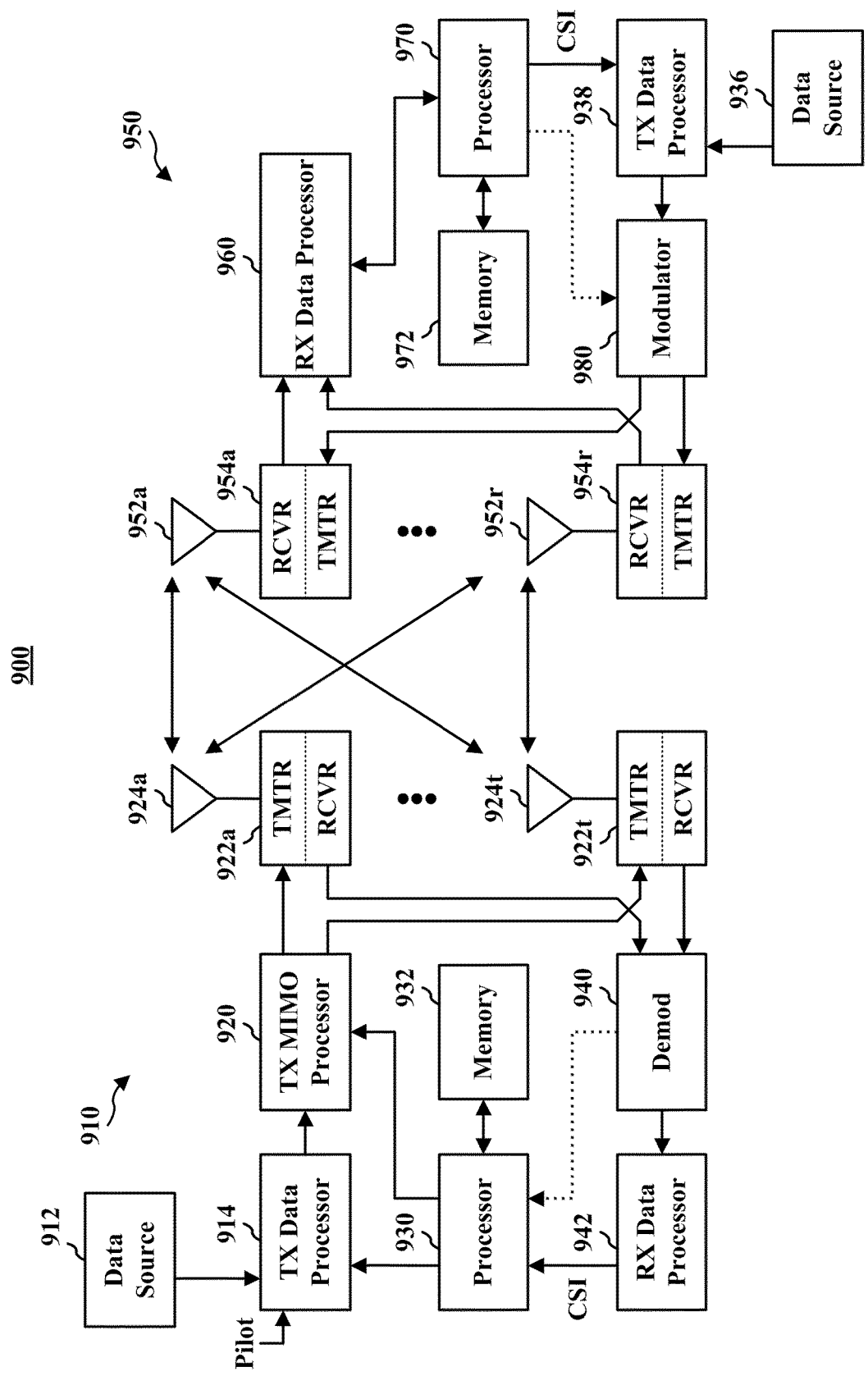
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-4 and 7-8) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various aspects, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which preceding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which preceding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
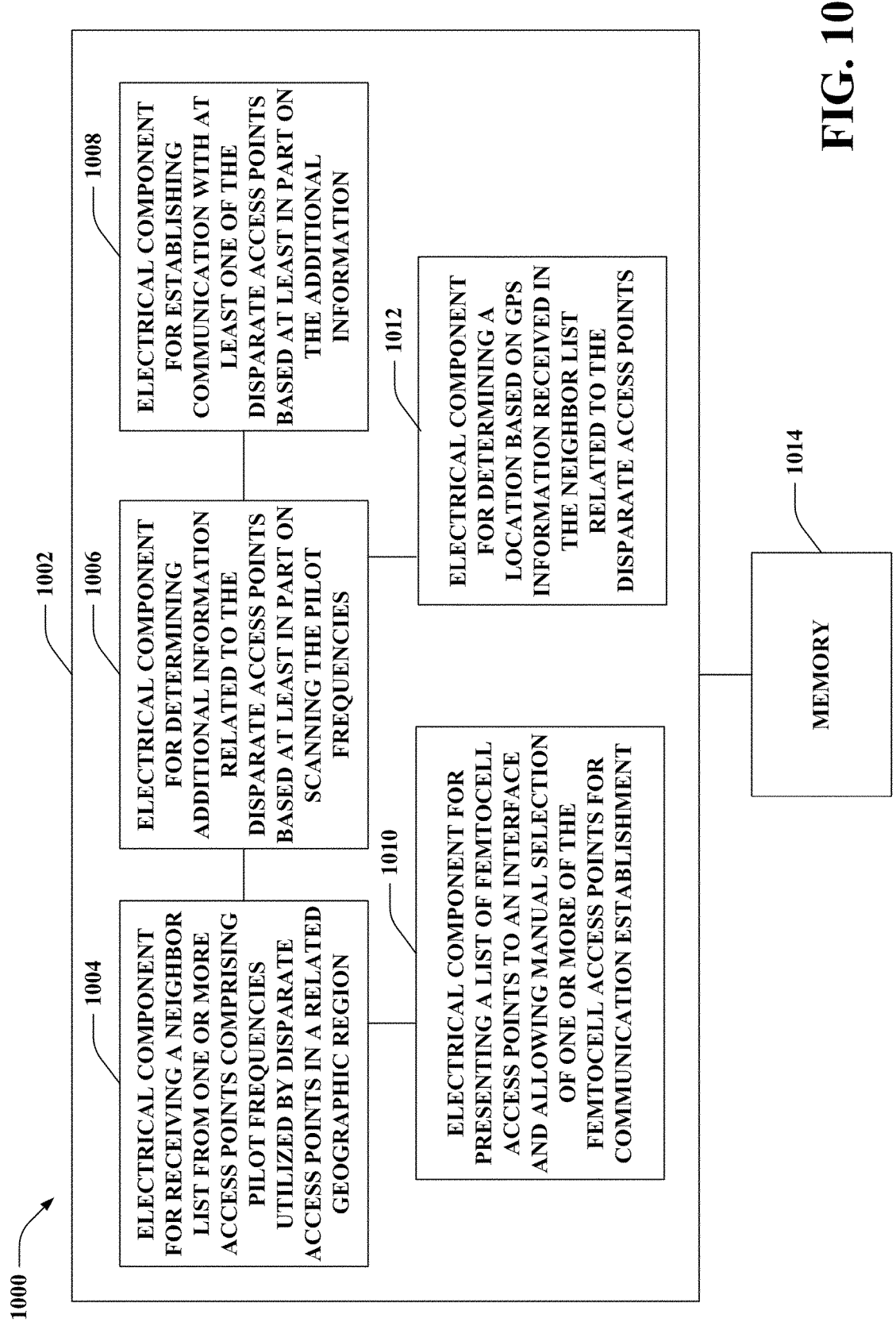
FIG. 10 is an illustration of an example system that receives a neighbor list comprising pilot frequencies of access points in a geographic region.

With reference to FIG. 10, illustrated is a system 1000 that receives a neighbor list of pilot frequencies corresponding to access points in a specific geographic region. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving a neighbor list from one or more access points comprising pilot frequencies utilized by disparate access points in a related geographic region 1004. For example, as described, the neighbor list can comprise additional information, such as access point type information, GPS location information, and/or the like. Further, logical grouping 1002 can comprise an electrical component for determining additional information related to the disparate access points based at least in part on scanning the pilot frequencies 1006.

As described, the disparate access points can be identified based on the pilot frequencies and one or more communication parameters can be detected from the pilot and/or based on requesting communication parameters from the disparate access points following detection. Furthermore, logical grouping 1002 can include an electrical component for establishing communication with at least one of the disparate access points based at least in part on the additional information 1008. In this regard, the additional information can comprise communication parameters such as PN offset, data channel information, and/or the like to allow communication establishment and/or cell reselection to the access point. In addition, logical grouping 1002 can include an electrical component for presenting a list of femtocell access points to an interface and allowing manual selection of one or more of the femtocell access points for communication establishment 1010. As described, the neighbor list can include one or more access point type identifiers; the identifiers can be received in the initial neighbor list and/or populated as one or more determined communication parameters. Moreover, logical grouping 1002 can include an electrical component for determining a location based on GPS information received in the neighbor list related to the disparate access points 1012. This can be accomplished, in one example, using triangulation, as described above, along with, for example, computed distances of the access points.

Additionally, system 1000 can include a memory 1014 that retains instructions for executing functions associated with electrical components 1004, 1006, 1008, 1010, and 1012. While shown as being external to memory 1014, it is to be understood that one or more of electrical components 1004, 1006, 1008, 1010, and 1012 can exist within memory 1014.

Figure 11:
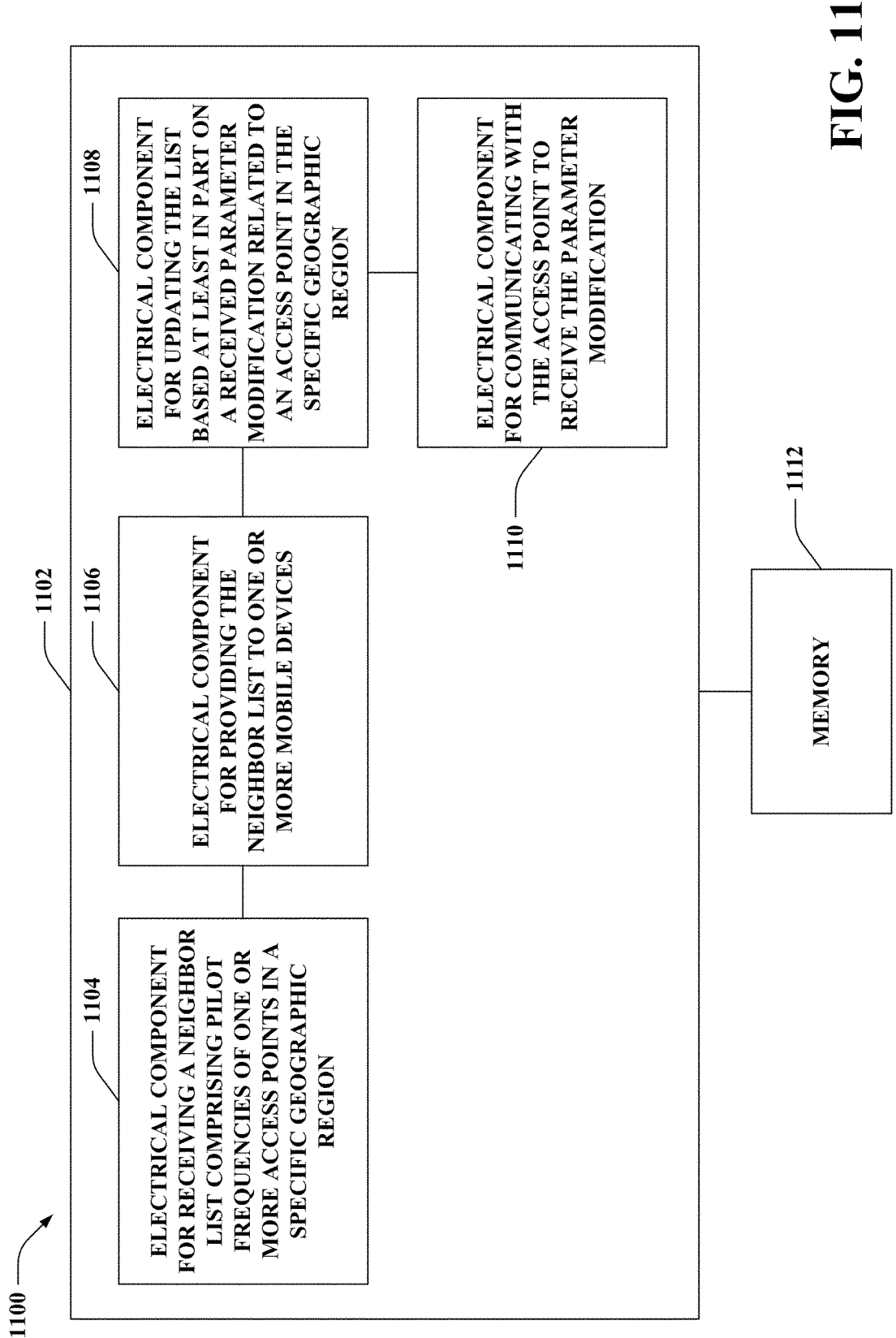
FIG. 11 is an illustration of an example system that facilitates providing a neighbor list of pilot frequencies related to access points in a specific region.

With reference to FIG. 11, illustrated is a system 1100 for providing a neighbor list of pilot frequencies to one or more mobile devices. For example, system 1100 can reside at least partially within a wireless network component. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for receiving a neighbor list comprising pilot frequencies of one or more access points in a specific geographic region 1104. The region can relate to a current region of the system 1100, as described. Further, logical grouping 1102 can comprise an electrical component for providing the neighbor list to one or more mobile devices 1106. Thus, the mobile devices can discover access points in the geographic region using the neighbor list, as described. Moreover, logical grouping 1102 can also comprise an electrical component for updating the list based at least in part on a received parameter modification related to an access point in the specific geographic region 1108. As described, the parameter modification can relate to addition of an access point to the region, modification of one or more parameters of other access points, and/or the like. Thus, since the list can be updated at the system 1100, mobile devices can receive updated lists to retain current access point information. Furthermore, logical grouping 1102 can include an electrical component for communicating with the access point to receive the parameter modification 1110. Additionally, system 1100 can include a memory 1112 that retains instructions for executing functions associated with electrical components 1104, 1106, 1108, and 1110. While shown as being external to memory 1112, it is to be understood that one or more of electrical components 1104, 1106, 1108, and 1110 can exist within the memory 1112.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
receiving a neighbor list from an access point located in a specific geographic region, wherein the neighbor list is specific to one or more cells of the access point and indicates preferred neighbor access points in the specific geographic region, wherein the neighbor list includes pilot frequencies of the preferred neighbor access points and an access point type identifier specifying an access point type associated with each of the preferred neighbor access points, and wherein at least one access point type identifier specifies a femto cell access point type for at least one of the preferred neighbor access points included in the neighbor list;
scanning one or more frequencies in the neighbor list based on the access point type to acquire additional communication parameters related to an associated preferred neighbor access point; and
populating a preferred roaming list with the additional communication parameters.

2. The method of claim 1, further comprising establishing communication with the associated preferred neighbor access point based at least in part on evaluating the additional communication parameters from the preferred roaming list.

3. The method of claim 2, wherein establishing communication with the associated preferred neighbor access point comprises receiving a neighbor list from the preferred neighbor access point that is specific to one or more cells of the associated preferred neighbor access point.

4. The method of claim 1, further comprising distinguishing femto cell access points in the neighbor list based at least in part on the access point type identifiers in the neighbor list.

5. The method of claim 4, further comprising providing a list of acquired identifiers of the femto cell access points in the neighbor list to an interface wherein the list of acquired identifiers are the additional communication parameters.

6. The method of claim 4, wherein scanning the one or more frequencies includes scanning only frequencies corresponding to femtocell access points.

7. The method of claim 1, further comprising receiving global positioning system (GPS) information, associated with the preferred neighbor access points in the neighbor list.

8. The method of claim 7, further comprising determining a location of a mobile device based at least in part on performing triangulation using the GPS information.

9. The method of claim 1, further comprising detecting a technology related to the associated preferred neighbor access point based at least in part on information in the neighbor list.

10. The method of claim 1, wherein scanning the one or more frequencies based on access point type comprises scanning only femtocell access points for which to acquire additional communication parameters.

11. The method of claim 1, further comprising
filtering the neighbor list based at least in part on the access point type identifiers specified in the neighbor list; and
establishing a communication session with one of the access points on the filtered neighbor list.

12. The method of claim 1, further comprising storing the neighbor list at a mobile device.

13. The method of claim 1, wherein the receiving, scanning, and populating are performed by a mobile device.

14. The method of claim 1, wherein at least two access point type identifiers specify a femto cell access point type for at least two of the preferred neighbor access points that are included in the neighbor list and are to be scanned in the geographic region.

15. The method of claim 1, wherein the neighbor list is associated with a first geographic region and the preferred roaming list is associated with a second geographic region that is larger than and encompasses the first geographic region.

16. A wireless communications apparatus, comprising:
at least one processor configured to:
receive a neighbor list from an access point located in a specific geographic region, wherein the neighbor list is specific to one or more cells of the access point and indicates preferred neighbor access points in the specific geographic region, wherein the neighbor list includes pilot frequencies of the preferred neighbor access points and an access point type identifier specifying an access point type associated with each of the preferred neighbor access points, and wherein at least one access point type identifier specifies a femto cell access point type for at least one of the preferred neighbor access points included in the neighbor list;
detect one or more of the preferred neighbor access points based at least in part on a respective pilot frequency in the neighbor list and on access point type;
determine one or more additional communication parameters for the one or more preferred neighbor access points; and
populate a preferred roaming list with the one or more additional communication parameters; and
a memory coupled to the at least one processor.

17. The wireless communications apparatus of claim 16, wherein the at least one processor is further configured to establish communication with at least one of the detected preferred neighbor access points utilizing the one or more additional communication parameters.

18. The wireless communications apparatus of claim 16, wherein the at least one processor is further configured to differentiate femtocell access points in the neighbor list based at least in part on the access point type identifiers in the neighbor list.

19. The wireless communications apparatus of claim 18, wherein the one or more preferred neighbor access points detected by the at least one processor are femtocell access points.

20. The wireless communications apparatus of claim 16, wherein the at least one processor is further configured to determine global positioning system (GPS) location information related to the one or more preferred neighbor access points based at least in part on information received in the neighbor list.

21. The wireless communications apparatus of claim 20, wherein the at least one processor is further configured to determine location of the wireless communication apparatus using triangulation based at least in part on the GPS location information.

22. An apparatus, comprising:
means for receiving a neighbor list from an access point located in a specific geographic region, wherein the neighbor list is specific to one or more cells of the access point and indicates preferred neighbor access points in the specific geographic region, wherein the neighbor list includes pilot frequencies of the preferred neighbor access points and an access point type identifier specifying an access point type associated with each of the preferred neighbor access points, and wherein at least one access point type identifier specifies a femto cell access point type for at least one of the preferred neighbor access points included in the neighbor list;
means for determining additional information related to the preferred neighbor access points based at least in part on scanning the pilot frequencies and on access point type; and
means for populating a preferred roaming list with the additional information.

23. The apparatus of claim 22, further comprising means for establishing communication with at least one of the preferred neighbor access points based at least in part on the additional information.

24. The apparatus of claim 22, wherein the means for determining additional information further distinguishes femtocell access points in the neighbor list based at least in part on the access point type identifiers in the list and determines additional information only for the femtocell access points.

25. The apparatus of claim 24, further comprising means for presenting a list of the femtocell access points to an interface and allowing manual selection of one or more of the femtocell access points for communication establishment.

26. The apparatus of claim 22, further comprising means for determining a location of the apparatus based on global positioning system (GPS) information received in the neighbor list related to the preferred neighbor access points.

27. The apparatus of claim 26, wherein the means for determining the location utilizes triangulation based at least in part on the GPS information to determine the location.

28. A non-transitory computer-readable medium comprising:
code for causing at least one computer to receive a neighbor list from an access point located in a specific geographic region, wherein the neighbor list is specific to one or more cells of the access point and indicates preferred neighbor access points in the specific geographic region, wherein the neighbor list includes pilot frequencies of the preferred neighbor access points and an access point type identifier specifying an access point type associated with each of the preferred neighbor access points;
code for causing the at least one computer to scan one or more frequencies in the neighbor list based on the access point type to acquire additional communication parameters related to an associated preferred neighbor access point, and wherein at least one access point type identifier specifies a femto cell access point type for at least one of the preferred neighbor access points included in the neighbor list; and
code for causing the at least one computer to populate a preferred roaming list with the additional communication parameters.

29. The computer readable-medium of claim 28, further comprising code for causing the at least one computer to establish communication with the associated preferred neighbor access point based at least in part on evaluating the additional communication parameters from the preferred roaming list.

30. The computer readable-medium of claim 28, further comprising code for causing the at least one computer to distinguish femtocell access points in the neighbor list based at least in part on the identifiers in the neighbor list.

31. The computer readable-medium of claim 28, further comprising code for causing the at least one computer to receive global positioning system (GPS) information, associated with the preferred neighbor access points in the neighbor list.

32. The computer readable-medium of claim 31, further comprising code for causing the at least one computer to determine a location of a mobile device based at least in part on performing triangulation using the GPS information.

33. An apparatus, comprising:
a neighbor list component that receives a neighbor list from an access point located in a specific geographic region, wherein the neighbor list is specific to one or more cells of the access point and indicates preferred neighbor access points in the specific geographic region, wherein the neighbor list includes pilot frequencies of the preferred neighbor access points and an access point type identifier specifying an access point type associated with each of the preferred neighbor access points, and wherein at least one access point type identifier specifies a femto cell access point type for at least one of the preferred neighbor access points included in the neighbor list; and
a network scanning component that detects pilots of one or more of the preferred neighbor access points based on the pilot frequencies and the access point type in the neighbor list, determines one or more additional communication parameters associated with the one or more preferred neighbor access points, and populates a preferred roaming list with the one or more additional communication parameters.

34. The apparatus of claim 33, further comprising a neighbor selection component that establishes communication with the one or more preferred neighbor access points based on the one or more additional communication parameters.

35. The apparatus of claim 33, wherein the neighbor list component differentiates femtocell access points in the neighbor list based on the access point type identifiers in the neighbor list.

36. The apparatus of claim 35, wherein the network scanning component detects pilots of only the femtocell access points.

37. The apparatus of claim 35, further comprising a neighbor presentation component that can display the femtocell access points based on receiving a manual scan command from an interface.

38. The apparatus of claim 33, further comprising a location component that computes a location of the apparatus based at least in part on global positioning system (GPS) location information presented in the neighbor list for the preferred neighbor access points.

39. The apparatus of claim 38, wherein the location component utilizes triangulation to compute the location using the GPS location information along with an estimated distance to the preferred neighbor access points.

40. A method, comprising:
receiving a neighbor list from an access point located in a specific geographic region, wherein the neighbor list is specific to one or more cells of the access point and indicates preferred neighbor access points in the specific geographic region, wherein the neighbor list includes pilot frequencies of the preferred neighbor access points and an access point type identifier specifying an access point type associated with each of the preferred neighbor access points, and wherein at least one access point type identifier specifies a femto cell access point type for at least one of the preferred neighbor access points included in the neighbor list;
transmitting the neighbor list to one or more mobile devices to supplement a preferred roaming list with additional communication parameters.

41. The method of claim 40, further comprising updating the neighbor list based at least in part on a received parameter modification related to an access point in the specific geographic region.

42. The method of claim 41, wherein the parameter modification relates to addition of the access point to the specific geographic region.

43. The method of claim 41, further comprising communicating with the access point to receive the parameter modification.

44. The method of claim 43, wherein the parameter modification relates to global positioning system (GPS) location information.

45. A wireless communications apparatus, comprising:
at least one processor configured to:
receive a neighbor list from an access point located in a specific geographic region, wherein the neighbor list is specific to one or more cells of the access point and indicates preferred neighbor access points in the specific geographic region, wherein the neighbor list includes pilot frequencies of the preferred neighbor access points and an access point type identifier specifying an access point type associated with each of the preferred neighbor access points, and wherein at least one access point type identifier specifies a femto cell access point type for at least one of the preferred neighbor access points included in the neighbor list; and
transmit the neighbor list to one or more mobile devices to supplement a preferred roaming list with additional communication parameters; and
a memory coupled to the at least one processor.

46. The wireless communications apparatus of claim 45, wherein the at least one processor is further configured to update the list based at least in part on a received parameter modification related to an access point in the geographic region.

47. An apparatus, comprising:
means for receiving a neighbor list from an access point located in a specific geographic region, wherein the neighbor list is specific to one or more cells of the access point and indicates preferred neighbor access points in the specific geographic region, wherein the neighbor list includes pilot frequencies of the preferred neighbor access points and an access point type identifier specifying an access point type associated with each of the preferred neighbor access points, and wherein at least one access point type identifier specifies a femto cell access point type for at least one of the preferred neighbor access points included in the neighbor list; and
means for providing the neighbor list to one or more mobile devices to supplement a preferred roaming list with additional communication parameters.

48. The apparatus of claim 47, further comprising means for updating the list based at least in part on a received parameter modification related to an access point in the specific geographic region.

49. The apparatus of claim 48, further comprising means for communicating with the access point to receive the parameter modification.

50. The apparatus of claim 49, wherein the parameter modification relates to global positioning system (GPS) location information.

51. A non-transitory computer-readable medium comprising:
- code for causing at least one computer to receive a neighbor list from an access point located in a specific geographic region, wherein the neighbor list is specific to one or more cells of the access point and indicates preferred neighbor access points in the specific geographic region, wherein the neighbor list includes pilot frequencies of the preferred neighbor access points and an access point type identifier specifying an access point type associated with each of the preferred neighbor access points, and wherein at least one access point type identifier specifies a femto cell access point type for at least one of the preferred neighbor access points included in the neighbor list; and
- code for causing the at least one computer to transmit the neighbor list to one or more mobile devices to supplement a preferred roaming list with additional communication parameters.

52. The computer readable medium of claim 51, further comprising code for causing the at least one computer to update the list based at least in part on a received parameter modification related to an access point in the geographic region.

53. An apparatus, comprising:
- a list management component that receives a neighbor list from an access point located in a specific geographic region, wherein the neighbor list is specific to one or more cells of the access point and indicates preferred neighbor access points in the specific geographic region, wherein the neighbor list includes pilot frequencies of the preferred neighbor access points and an access point type identifier specifying an access point type associated with each of the preferred neighbor access points, and wherein at least one access point type identifier specifies a femto cell access point type for at least one of the preferred neighbor access points included in the neighbor list; and
- a list transmitting component that sends the neighbor list to one or more mobile devices to supplement a preferred roaming list with additional communication parameters.

54. The apparatus of claim 53, further comprising an update receiving component that processes an update related to an access point in the geographic region and modifies the neighbor list according to the update.

55. The apparatus of claim 54, wherein the update related to the access point corresponds to adding the access point to a wireless network.

56. The apparatus of claim 54, wherein the update relates to global positioning system (GPS) information of the access point.

* * * * *